No. 876,337. PATENTED JAN. 14, 1908.
H. DÜNHÖLTER.
CHANGE SPEED GEAR.
APPLICATION FILED APR. 26, 1907.
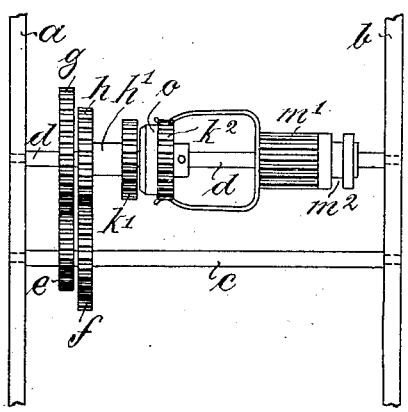
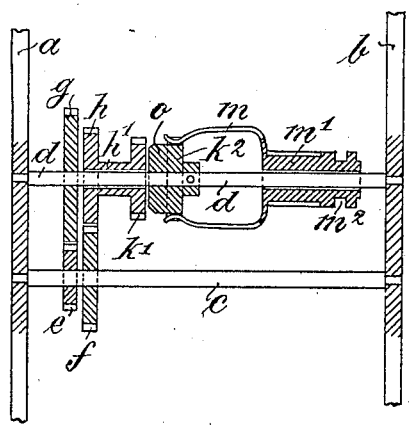
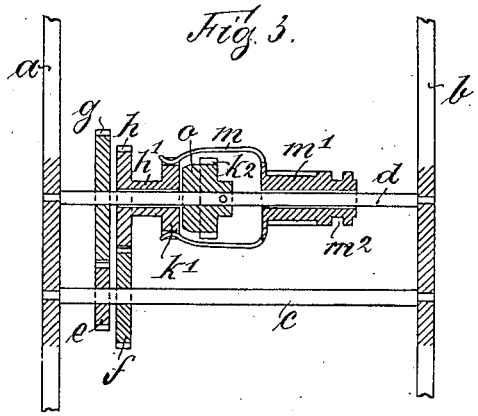

UNITED STATES PATENT OFFICE.

HEINRICH DÜNHÖLTER, OF BERLIN, GERMANY.

CHANGE-SPEED GEAR.

No. 876,337.  Specification of Letters Patent.  Patented Jan. 14, 1908.

Application filed April 26, 1907. Serial No. 370,397.

*To all whom it may concern:*

Be it known that I, HEINRICH DÜNHÖLTER, a subject of the King of Prussia, and resident of 5 Neue Jacobstrasse, Berlin, Kingdom of Prussia, German Empire, have invented certain new and useful Improvements in Change-Speed Gears for Fare-Indicators, of which the following is an exact specification.

This invention relates to change speed gears, more particularly to improvements in tax-feeding mechanisms for fare indicators. As known these feeding mechanisms have the object of connecting the indicating mechanism with the driving mechanism of the fare indicator in such manner that the indicating mechanism is caused to be operated at various speeds compared with any constant speed of the vehicle, cab or the like, so that different amounts to be paid are indicated to the customer when equal lengths of way are described by the vehicle.

In the known construction of feeding mechanisms an arrangement is provided, according to which several wheels of various sizes, corresponding to the various charges or taxes for the vehicles, are arranged on a shaft belonging to the indicating mechanism, and toothed wheels or the like arranged on another shaft driven on by the back wheel of the vehicle in any convenient manner, mesh with the first mentioned wheels. These wheels can be thrown alternatively into gear with the wheels on the driving shaft, to drive the indicator mechanism faster or slower. According to this arrangements for changing the charge for the vehicle it is required to throw into action two wheels and to throw out of action two wheels each time. For carrying out the change a gap in the teeth must be opposite to a tooth, otherwise there was no possibility of throwing into gear the corresponding toothed wheels and this can be done only after the driving shaft is turned further, which revolution must not be indicated by the indicating mechanism.

According to the present invention the necessity of throwing into gear and disengaging the toothed wheels respectively on the driven and the driving shaft is avoided and the same number of wheels is arranged on both the shafts, one wheel being fixedly mounted on the driven shaft and the other being loosely arranged on the same. Means are provided for coupling the wheels of the driven shaft with the indicating mechanism proper.

To make my invention clear, reference is had to the accompanying drawings, in which by way of example a convenient structure of the feeding mechanism is illustrated.

Figure 1 is a side elevation, Fig. 2 a vertical section, and Fig. 3 illustrates another position of the feeding mechanism in a vertical section.

Referring to the figures: $c$ is a driving shaft, and $d$ is the driven shaft; $c$ may be operated in any suitable manner, which does not form part of the present invention.

$a$ and $b$ are two bearing shields or the like, in which the shafts $c$ and $d$ are journaled.

In the present constructional form it is supposed that two taxes shall be indicated by the indicating mechanism, and two toothed wheels $e$ and $f$ are fixedly mounted on the driving shaft $c$, the wheels being of different sizes.

$g$ and $h$ are the two corresponding driven toothed wheels, $g$ being fixedly mounted on the driven shaft $d$, whereas the wheel $h$ is loosely placed on this shaft.

$h'$ is a sleeve made integrally with the toothed wheel $h$ and connecting the coupling wheel $k'$ with the toothed wheel $h$. $k^2$ is another toothed wheel having the same diameter as the toothed wheel $k'$ and being fixedly carried by the shaft $d$.

$o$ is a disk which in the present case is shaped as a brake-disk and is rigidly connected with the wheel $k^2$.

$m'$ is a toothed wheel for the purpose of connecting the shaft $d$ with the indicating mechanism and $m^2$ is an annular groove arranged in the cylindrical elongation of the toothed wheel $m'$. With this groove any convenient lever or operating device engages (not further shown) for the purpose of shifting the toothed wheel $m'$ on the shaft $d$.

$m$ are two arms which extend from the toothed wheel $m'$ and are adapted to engage with the wheel $k^2$, the wheel $k'$ and the brake disk $o$. The wheel $m'$ is, as will be seen from the drawing, loosely arranged on the shaft $d$ and adapted to be shifted longitudinally on the latter.

According to the foregoing statements the operation of the feeding mechanism will be obvious. The toothed wheels $e$ and $g$ on the one side, and $f$ and $h$ on the other side are permanently meshing with each other. For transmitting the movement of the toothed wheel $g$ to the transmitting wheel $m'$, the arm $m$ must be in engagement with the toothed wheel $k^2$ (see Fig. 2), what is obtained by shifting longitudinally the wheel $m'$ on the shaft $d$ to the lefthand side. According to Fig. 3 the toothed wheel $h$ is driving the wheel $m'$, because the arms $m$ engage with the teeth of the wheel $k'$.

For facilitating the coupling of the arms $m$ with the wheels $k'$ $k^2$, the clutch disk $o$ is provided, the diameter of which is kept thus that the friction produced by the contact of the arms $m$ with the circumferential face of the disk $o$ causes the wheel $m'$ to be rotated. By this way a rotation of the latter wheel is maintained, even when the arms $m$ and the wheels $k'$ and $k^2$ are disengaged.

It will be observed that three or more pairs of wheels can be provided on the driving and the driven shaft. Again, it is not necessary, to provide the wheels $k'$ $k^2$ with teeth, any other convenient clutch arrangement can be fitted, for instance the wheels $k'$ $k^2$ can be provided with a cylindrical face and a sufficient pressure between the smooth peripheries of the wheels and the arms can maintain the required connection between the parts. In this case the clutch parts can be arranged side by side and the disk $o$ can be dispensed with.

Having thus fully described the nature of this invention, what I desire to secure by Letters Patent of the United States is:—

1. The hereindescribed change speed gear for fare indicators comprising: a driving shaft and several driving toothed wheels of different sizes, fixedly mounted on the driving shaft, several driven toothed wheels permanently engaging with the driving toothed wheels, one driven toothed wheel being fixedly, and the other wheels being loosely mounted on the driven shaft, a transmitting wheel $(m')$ loosely mounted on the driven shaft and adapted to be shifted longitudinally, and clutch means for conveying the revolution of the driven toothed wheels for the purpose as described.

2. The hereindescribed change speed gear for fare-indicators, comprising: a driven shaft and two driven toothed wheels, one wheel being fixedly, the other being loosely mounted on the driven shaft, a clutch part $(k')$ fixedly connected with the driven wheel which is loosely mounted on its shaft, a clutch part $(k^2)$ fixed on the driven shaft and of the same diameter as the first mentioned clutch part, a transmitting toothed wheel adapted to be shifted longitudinally and having coupling arms adapted to engage with the said clutch parts.

3. The hereindescribed change speed gear for fare-indicators, comprising: a driven shaft and two driven toothed wheels, one wheel being fixedly, the other being loosely mounted on the driven shaft, a toothed wheel $(k')$ fixedly connected with the driven wheel which is loosely mounted on its shaft, a toothed wheel $(k^2)$ fixedly arranged on the driven shaft and of the same diameter as the toothed wheel $(k')$, a transmitting wheel adapted to be shifted longitudinally and having coupling arms adapted to engage with the said toothed wheels $(k'$ $k^2)$ respectively.

4. The hereindescribed change speed gear for fare-indicators, comprising: a driven shaft and two driven toothed wheels, one wheel being fixedly, the other being loosely mounted on the driven shaft, a toothed wheel $(k')$ fixedly connected with the driven wheel, which is loosely mounted on its shaft, a toothed wheel $(k^2)$ fixedly arranged on the driven shaft and of the same diameter as the toothed wheel $(k')$, a clutch-disk rigidly connected with the toothed wheel $(k^2)$ and of the same diameter, a transmitting wheel loosely mounted on the driven shaft and having coupling arms adapted to engage with the toothed wheels $(k'$ $k^2)$ and the said clutch disk.

In witness whereof I have hereunto set my hand in the presence of two witnesses.

HEINRICH DÜNHÖLTER.

Witnesses:
WOLDEMAR HAUPT,
HENRY HASPER.